United States Patent
Utsunomiya et al.

(10) Patent No.: US 7,214,440 B2
(45) Date of Patent: May 8, 2007

(54) METALLIC SEPARATOR FOR FUEL CELL AND PRODUCTION METHOD FOR THE SAME

(75) Inventors: Masao Utsunomiya, Wako (JP); Makoto Tsuji, Wako (JP); Takashi Kuwayama, Wako (JP); Teruyuki Ohtani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 10/811,391

(22) Filed: Mar. 29, 2004

(65) Prior Publication Data

US 2004/0197661 A1 Oct. 7, 2004

(30) Foreign Application Priority Data

Mar. 28, 2003 (JP) .............................. 2003-090395

(51) Int. Cl.
*H01M 2/00* (2006.01)
*C25D 3/48* (2006.01)
*C25D 7/06* (2006.01)
*C25D 5/02* (2006.01)
*C25D 5/00* (2006.01)

(52) U.S. Cl. .................. 429/34; 205/267; 205/152; 205/118; 205/112; 205/149

(58) Field of Classification Search .................. 429/34; 205/266, 267, 152, 118, 112, 149
See application file for complete search history.

(56) References Cited

U.S. PATENT DOCUMENTS 2,133,996 A * 10/1938 Underwood ................. 205/219

FOREIGN PATENT DOCUMENTS

| JP | 10-228914 | * | 8/1998 |
| JP | 09-022708 | | 1/1999 |

* cited by examiner

*Primary Examiner*—Patrick Joseph Ryan
*Assistant Examiner*—Thomas H. Parsons
(74) *Attorney, Agent, or Firm*—Arent Fox LLP

(57) ABSTRACT

A metallic separator for a fuel cell has excellent corrosion resistance and contact resistance, even when a gold coating is applied directly without a surface treatment by a nickel coating. The metallic separator for a fuel cell, comprising stainless steel having a surface, can be obtained by coating at 2.3 to 94% of area rate on the surface without a surface treatment.

5 Claims, 3 Drawing Sheets

0.5 μm

METALLIC SEPARATOR FOR FUEL CELL AND PRODUCTION METHOD FOR THE SAME

BACKGROUND OF THE INVENTION

1. Technical Field

The present invention relates to a metallic separator which is a component part of a solid polymer fuel cell and forms a gas passage for fuel cell, and relates to a production method for the same.

2. Related Art

In a solid polymer fuel cell, a laminated body, in which, on both sides of a planar MEA (Membrane Electrode Assembly), a separator is laminated, is regarded as one unit, and plural units are stacked and form a fuel cell stack. The MEA is formed as a three layer structure in which, between a pair of gas diffusion electrodes that constitute a cathode and an anode, an electrolyte membrane made of, for example, an ion exchange resin, is interposed. In the gas diffusion electrode, outside of an electrode catalyst layer in contact with an electrolyte membrane, a gas diffusion layer is formed. Furthermore, the separator, laminated so as to come into contact with the gas diffusion electrode of the MEA, is provided with a gas passage that allows a gas to flow and a coolant passage between the separator and the gas diffusion electrode. According to such a fuel cell, for example when a hydrogen gas as a fuel is allowed to flow in the gas passage facing the gas diffusion electrode on the anode side, and an oxidizing gas such as oxygen or air is allowed to flow in the gas passage facing the gas diffusion electrode on the cathode side, there occurs an electrochemical reaction, resulting in the generation of electricity.

The separator must function so that, while electrons generated at the anode side according to a catalytic reaction of the hydrogen gas are supplied to an external circuit, electrons from the external circuit may be supplied to the cathode side. Accordingly, for the separator, a conductive material made of a graphite-based material or a metal-based material is used, and in particular the metal-based material is regarded as being advantageous in view of superiority in mechanical strength and in ability to be made lighter and more compact by being formed into a thin plate. As a metallic separator, one in which, for example, a thin plate of stainless steel or titanium alloy, which are each metallic materials having excellent corrosion resistance, is press-molded into a shape having concavities and convexities on the surface, can be cited. In these separators, various techniques are proposed (see, for example, Japanese Patent Application, First Publication, No. 9-22708).

However, when the separator of stainless steel described in the patent document is used, a contact resistance between MEA and the separator is larger than that when a separator of the graphite-based material is used. Increasing the contact resistance induces decreasing performance in power generation. Therefore, gold is coated on the surface of the separator by means of, for example, a coating method, so as to decrease the contact resistance. In the gold coating, a surface treatment is generally performed by nickel coating so as to increase adhesion between stainless steel and the gold. However, when defects, for example, pinholes, are generated in the gold coating, nickel which is a component of the surface treatment is easily eluted. Therefore, there is a problem in the conventional separator that corrosion resistance is low even when the gold coating is performed. Moreover, there is another problem in that the elution of nickel induces decrease of the ion exchange capacity of electrolyte membrane or increase in the peeling of the gold coating, resulting in increased contact resistance.

SUMMARY OF THE INVENTION

Therefore, an object of the present invention is to provide a metallic separator for a fuel cell in which excellent corrosion resistance and contact resistance is obtained, in a condition of directly forming a gold coating without a surface treatment by a nickel coating, to solve the above-mentioned problems.

The metallic separator for a fuel cell of the present invention is characterized in that gold is coated at 2.3 to 94% of area rate on the surface of the stainless steel plate without performing the surface treatment. In the present invention, even if defects, for example, pinholes, are generated, the substrate component is not eluted, by directly performing the coating on the surface of the material plate without surface treatment. Therefore, it is difficult for the gold coating to separate, whereby the contact resistance between the separator and MEA can be suppressed to be low. The coating behavior of gold on stainless steel plate, when the gold is directly coated on the stainless steel plate, will be explained hereinafter.

1) In the initial stage, gold grains appeared as cores on the stainless steel plate, and the grains grew on the surface of the stainless steel plate. In this stage, the area rate of gold is less than 2.3%, and gold exists on the stainless steel in the shape of a dot.

2) In the intermediate stage, the growing grains connect together, whereby area rate of gold gradually increases. In this stage, the area rate of gold is 2.3 to 94%, and gold exists on the stainless steel in the shape of islands or mottling.

3) In the final stage, gold is coated on approximately the entire surface; thereafter, the coating proceeds in the direction of thickness. In this stage, the area rate of gold is more than 94%, and gold exists on approximately the entire area of the stainless steel.

The coating behavior of gold described above will be shown in FIG. 1. In FIG. 1, areas divided into A, B, and C respectively correspond to the above-mentioned initial, intermediate, and final stages. In the initial stage (the area of A in FIG. 1), the amount of gold is low. Therefore, the contact resistance between metallic separator and MEA is extremely high in this stage. Moreover, in the final stage (the area C in FIG. 1), a contact corrosion in heterogeneous metal can occur between stainless steel and gold. The contact corrosion in heterogeneous metal in this case is a phenomenon generated by making a stainless steel as a parent material polarized in a positive potential in a solution. When the potential of a stainless steel as a parent material exceeds a critical level, the passivation film is broken, whereby corrosion occurs. Therefore, in the area C in FIG. 1, excellent corrosion resistance of the metallic separator is not realized. Accordingly, the above-mentioned medium stage (the area of B in FIG. 1) is a preferable coating range of gold. According to the present invention, gold is coated on the surface of the stainless steel at 2.3 to 94% of the area rate; that is, the area rate of gold is in the range of the area of B shown in FIG. 1, whereby excellent corrosion resistance and contact resistance of the metallic separator for fuel cell can be simultaneously realized. Additionally, in the present invention, gold, which is a relatively flexible metal, is coated. Therefore, in the present invention, abrasion of a diffusion layer in MEA which contacts with separators during use of the separators can be suppressed, compared with a case of making separators only of stainless steel.

Accordingly, decreasing the performance of power generation based on decreasing gas diffusion of the diffusion layer by abrasion of the diffusion layer can be suppressed in the present invention.

In the metallic separator for a fuel cell described above, the amount of gold is preferably not less than 0.019 mg/cm$^2$. In performing the gold coating on the stainless steel plate, when an amount per unit area of gold on the stainless steel plate (which will be referred to simply as gold amount) is gradually increased, as shown in FIG. 2, the contact resistance between metallic separator and MEA is rapidly decreased in a amount range of less than 0.019 mg/cm$^2$. However, the contact resistance is hardly decreased in a amount range of not less than 0.019 mg/cm$^2$. Therefore, decreasing the contact resistance, which is an object of the present invention, can be realized at another high level, by means of setting the gold amount to be not less than 0.019 mg/cm$^2$.

Moreover, in the above-mentioned metallic separator for a fuel cell, the gold amount is preferably not more than 1.76 mg/cm$^2$. The inventors have found that when a self-potential of stainless steel in a state of elemental substances in solution against sulfuric acid at 90° C. and pH 3 (which will be referred to simply as self-potential of stainless steel in a state of elemental substances) exceeds 0.48 V, the passivation film of stainless steel is broken, resulting in generation of the corrosion. FIG. 3 is a graph showing a relationship between self-potential of stainless steel in a state of elemental substances and gold amount. As mentioned above, it is apparent from the figure that the critical potential of stainless steel in a state of elemental substances is 0.48 V, whereby when the gold amount is not more than 1.76 mg/cm$^2$, the contact corrosion in heterogeneous metal between a stainless steel plate and gold cannot occur. Therefore, increasing the corrosion resistance, which is another object of the present invention, can be realized at another high level, by means of setting the gold amount to be not more than 1.76 mg/cm$^2$. Accordingly, FIG. 4 is a graph showing a relationship between Fe concentration in a generating-solution and the gold amount in generating electric power for 1000 hours, and this graph is a corroboration that the above-mentioned critical potential is 0.48 V. According to FIG. 4, when the gold amount exceeds 1.76 mg/cm$^2$, Fe concentration is rapidly increased, whereby performance for power generation is deceased. The reason for this phenomenon is the reason contact corrosion in heterogeneous metal between gold and stainless steel is generated, whereby Fe in the stainless steel is dissolved.

Moreover, in the above-mentioned metallic separator for a fuel cell, an average grain diameter of gold which is coated is preferably 0.01 to 50 μm. When the average grain diameter is small, many grain boundaries exist in the gold coated layer, resulting in decreasing electrical conductivity. In particular, when the average grain diameter is less than 0.01 μm, decreasing the electrical conductivity induces rapidly increasing the contact resistance, and this phenomenon is undesirable. On the other hand, when the average grain diameter is large, the electrical conductivity is increased. However, in this case, coating amount which is necessary to coat is increased. In particular, when the average grain diameter exceeds 50 μm, the electrical conductivity is not further increased, and therefore, this is not economical and is undesirable.

Next, the production method for the metallic separator for a fuel cell of the present invention is characterized in that a gold coating is formed on the surface of the stainless steel plate without performing the surface treatment, and gold is coated at 2.3 to 94% of area rate. In the present invention, even if defects, for example, pinholes, are generated, the substrate component is not eluted, by directly performing the coating on the surface of the material plate without surface treatment. Therefore, it is difficult for the gold coating to separate, whereby the contact resistance between the separator and MEA can be suppressed to be low. Moreover, adhesion of gold against the stainless steel as a parent material can be increased by performing the gold coating in acid bath. Furthermore, in the present invention, gold is coated on the surface of the stainless steel at 2.3 to 94% of area rate, whereby excellent corrosion resistance and contact resistance for a metallic separator for a fuel cell is simultaneously realized as described above. Additionally, the gold amount is preferably 0.019 to 1.76 mg/cm$^2$, and the average grain diameter of gold which is coated is preferably 0.01 to 50 μm, for the above-mentioned reasons.

EXAMPLES

Hereinafter, practical examples will be explained.

A. Production of Separators

Production Examples 1 to 10

Figure 1:
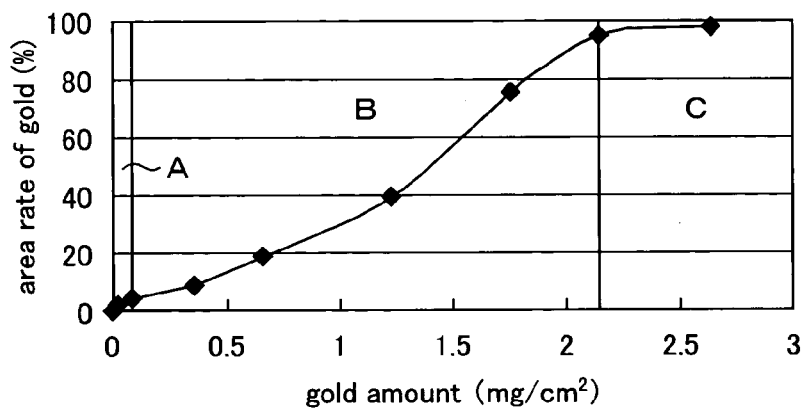
FIG. 1 is a graph showing the relationship between area rate of gold and gold amount.
Figure 2:
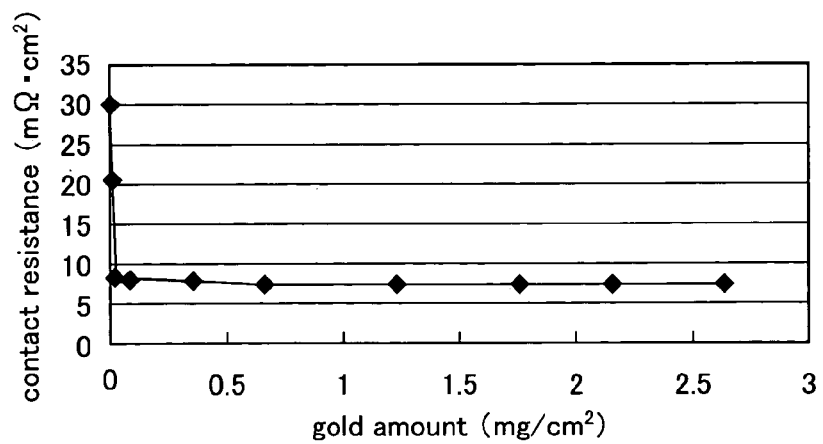
FIG. 2 is a graph showing the relationship between contact resistance and gold amount.
Figure 3:
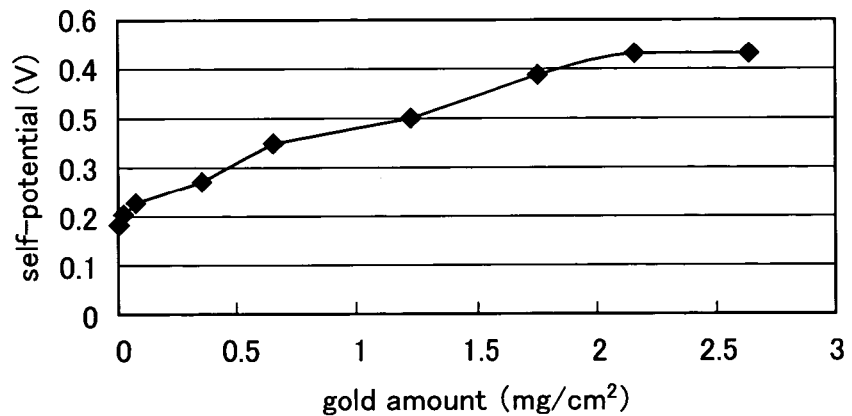
FIG. 3 is a graph showing the relationship between self-potential and gold amount.
Figure 4:
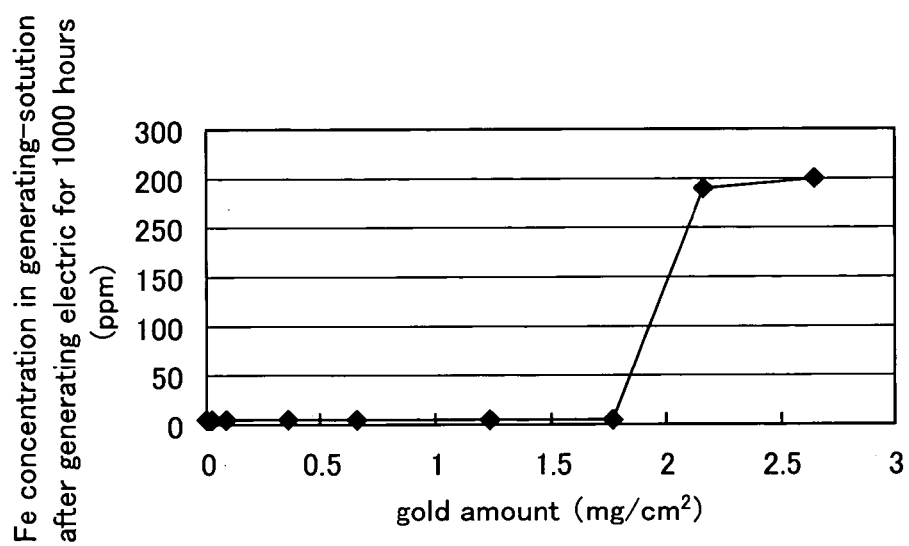
FIG. 4 is a graph showing the relationship between Fe concentration in generating-solution and gold amount after generating electric power for 1000 hours.
Figure 5:
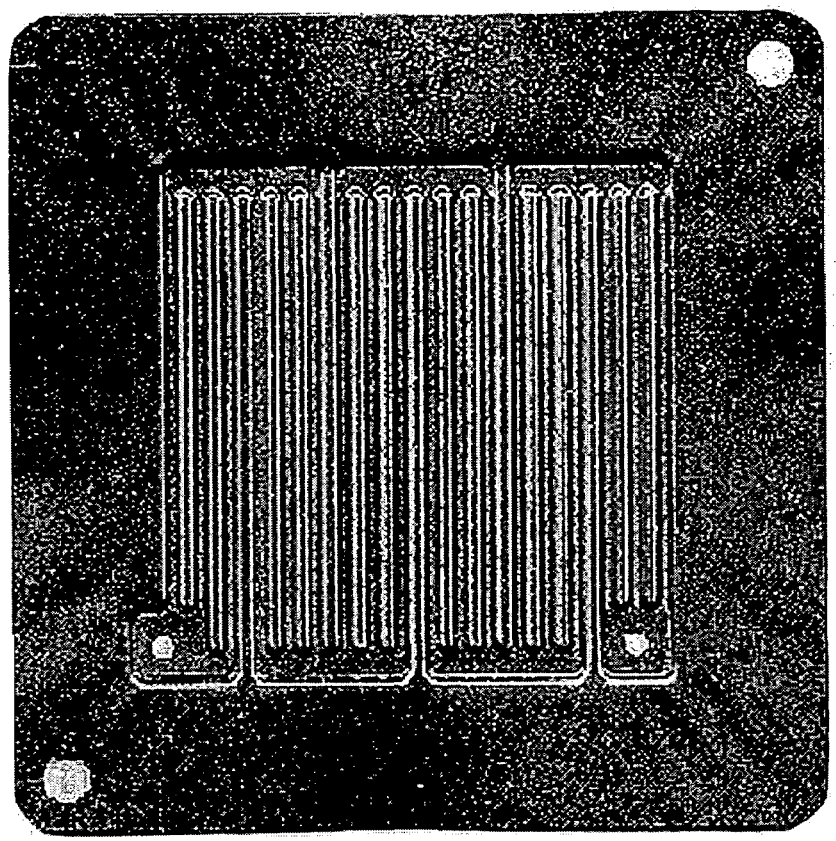
FIG. 5 is a photograph of a separator produced by a practical example of the present invention.

A stainless steel plate made of SUS316L was rolled up to a thickness of 0.2 mm, and rolled steels were cut into many thin plates of 100 mm square, whereby necessary sizing of the thin plates was obtained. Next, these thin plates were press-molded, whereby material plates shown in FIG. 5 were obtained. These material plates had a portion for power generation of concavo-convex shape in cross section in the center of the plates, and had a flat edge portion around the portion for power generation.

Next, a passivation treatment was performed on both surfaces of the material plate, whereby a firm oxide film was formed on the surface of the parent material. The passivation treatment was performed by performing solvent degreasing on the material plate using acetone for 10 min, and then the material plate was dipped into a 10 wt % nitric acid solution bath held at 30° C. for 10 min. After the passivation treatment, the material plate was washed with water at ordinary temperature for 10 min twice, and then the material plate was dried. Next, a gold coating was formed on both sides of the material plates. The gold coating was formed by dipping the material plate into a coating bath made of gold cyanide (2 g/L) which was held at 30° C., was arranged at a current density of 1.0 A/dm$^2$, and was set at a pH of 0.5 to 0.9. In that case, dipping times were set at 10 durations of 1, 2, 3, 4, 7, 10, 15, 20, 25, and 30 min, whereby gold amount increased as the dipping time increased. After the gold coating, water washing was performed by water at ordinary temperature for 10 min twice, whereby separators of production examples 1 to 10 were obtained.

B. Observation of the Surface

Figure 6:
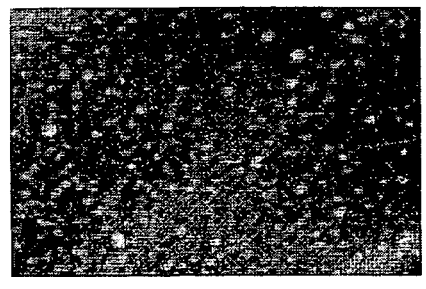
FIG. 6 is a photograph by a SEM (scanning electron microscope) of a separator in production example 5.

Surfaces of the above-mentioned production examples 1 to 10 were observed by microscope, whereby the states of the gold were determined. The result of the determinations will be shown in Table 1. That is, the gold coating states were the shape of a dot in production examples 1 to 3, the shape of islands or mottling in production examples 4 to 8, and a coating on approximately the entire surface in production examples 9, 10. In these production examples, surface of a separator in which gold was coated for 7 min (production example 5) was observed by SEM. FIG. 6 is a SEM photograph of the production example 5. As shown in the FIG. 6, gold of a grain shape is apparently precipitated in a shape of island.

TABLE 1

| | gold coating treatment time (min) | state of gold | area rate (%) | gold amount (mg/cm$^2$) |
|---|---|---|---|---|
| Production Example 1 | 1 | dot | 0.5 | 0.004 |
| Production Example 2 | 2 | dot | 0.8 | 0.007 |
| Production Example 3 | 3 | dot | 2.2 | 0.019 |
| Production Example 4 | 4 | island or mottling | 4 | 0.08 |
| Production Example 5 | 7 | island or mottling | 8.5 | 0.35 |
| Production Example 6 | 10 | island or mottling | 19 | 0.65 |
| Production Example 7 | 15 | island or mottling | 39 | 1.22 |
| Production Example 8 | 20 | island or mottling | 75 | 1.76 |
| Production Example 9 | 25 | approximately entire surface | 95 | 2.16 |
| Production Example 10 | 30 | approximately entire surface | 98 | 2.64 |

C. Measurement of Area Rate of Gold

The coating area of gold of a grain shape was measured from a SEM photograph at 1000× by using image analysis software, and then the gold area was calculated. Specifically, 30 portions were randomly selected, the area rates of gold were measured on an overall view of the respective selected portions, and then average values were calculated. The calculated average values of the area rates of gold are also shown in the Table 1.

D. Measurement of the Gold Amount

In the above-mentioned separators of production examples 1 to 10, the gold amounts were measured as described below. The respective separator was dissolved into aqua regia, the gold amount included in the solution was quantitatively analyzed by using a plasma emission sprectrophotometer (produced by Seiko Instruments Inc.; SPS-4000 type), and the gold amount was calculated from the values of the quantitative analysis. The results of the gold amount are also shown in Table 1.

E. Measurement of Contact Resistance in Initial Stage

In the 10 kinds of separators, the contact resistance in the initial stage was measured as described below. That is, carbon paper forming the surface of the gas diffusion layer of MEA was sandwiched by 2 sheets of separators, these separators were sandwiched by 2 electrode plates, and load was applied so as to set the surface pressure of the separators against the electrode plates to be 5 g/cm$^2$, whereby a test piece was set. Moreover, the current was applied between 2 sheets of separators, whereby contact resistance was obtained from the potential drop between the 2 separators. The result of the contact resistance is shown in Table 2. As shown in Table 2, excellent contact resistance is realized in production examples 4 to 8 in which gold exists in state of islands or mottling, and in production examples 9 and 10 in which gold exists in approximately the entire areas.

TABLE 2

| | contact resistance (mΩ·cm$^2$) | self-potential (V) | Fe concentration in generating-solution in generating electric power for 1000 hours (ppm) |
|---|---|---|---|
| Production Example 1 | 30 | 0.18 | 3 |
| Production Example 2 | 20.7 | 0.181 | 3 |
| Production Example 3 | 8.3 | 0.198 | 3 |
| Production Example 4 | 8 | 0.223 | 4 |
| Production Example 5 | 8 | 0.268 | 4 |
| Production Example 6 | 7.7 | 0.342 | 4 |
| Production Example 7 | 7.8 | 0.402 | 5 |
| Production Example 8 | 7.7 | 0.481 | 5 |
| Production Example 9 | 7.7 | 0.531 | 240 |
| Production Example 10 | 7.8 | 0.532 | 250 |

F. Measurement of the Self-potential

The self-potential in sulfuric acid of pH 3 at 90° C. was measured by using impregnation calomel electrode. In this measurement, HZ-3000 produced by HOKUTO DENKO CORPORATION was used. The result of the self-potential is also shown in Table 2. As shown in Table 2, excellent self-potential is realized in production examples 1 to 3 in which gold exists in state of dot, and in production examples 4 to 8 in which gold exists in state of islands or mottling.

G. Measurement of Fe Concentration in Generating-solution after Generating Electric Power for 1000 Hours.

A constant current (0.5 A/cm$^2$) was applied to each separator for 1000 hours, and performance of power generation was thereby tested. A generating-solution was obtained, and then Fe concentration was measured by using an ICP-MS device (inductively-coupled plasma mass spectrometer; HP4500 type produced by Yokokawa Analytical Systems). The result of the Fe concentration is also shown in Table 2. As shown in Table 2, excellent performance of power generation is realized in production examples 1 to 3 in which gold exists in the state of a dot, and in production examples 4 to 8 in which gold exists in the state of an island or mottling.

What is claimed is:

1. A metallic separator for a fuel cell, comprising a stainless steel plate having a surface, wherein gold is coated on the surface at 2.3 to 94% of area rate with respect to an area where the gold is coated without surface treatment by a nickel coating.

2. The metallic separator for a fuel cell, according to claim 1, wherein the amount of gold with respect to an area where the gold is coated is not less than 0.019 mg/cm$^2$.

3. The metallic separator for a fuel cell, according to claim 1, wherein the amount of gold with respect to an area where the gold is coated is not more than 1.76 mg/cm$^2$.

4. The metallic separator for a fuel cell, according to claim 1, wherein an average grain diameter of gold which is coated is 0.01 to 50 μm.

5. A production method for a metallic separator for a fuel cell, comprising a stainless steel plate having a surface, the method comprising a step of coating gold on the surface in an acid bath without performing surface treatment, wherein the gold is coated on the surface at 2.3 to 94% of area rate with respect to an area where the gold is coated.

* * * * *